US010210717B2

(12) United States Patent
Ooi et al.

(10) Patent No.: US 10,210,717 B2
(45) Date of Patent: Feb. 19, 2019

(54) DETECTING RF TRANSMISSION FROM AN IMPLANTED DEVICE IN A POS TERMINAL

(71) Applicant: VeriFone, Inc., San Jose, CA (US)

(72) Inventors: Wai Loon Ooi, Singapore (SG); John Han Ngee Chia, Singapore (SG)

(73) Assignee: VERIFONE, INC., San Jose, CA (US)

( * ) Notice: Subject to any disclaimer, the term of this patent is extended or adjusted under 35 U.S.C. 154(b) by 13 days.

(21) Appl. No.: 15/451,875

(22) Filed: Mar. 7, 2017

(65) Prior Publication Data

US 2018/0261051 A1 Sep. 13, 2018

(51) Int. Cl.
*G07F 19/00* (2006.01)
*G06K 19/073* (2006.01)

(52) U.S. Cl.
CPC ....... *G07F 19/2055* (2013.01); *G06K 19/073* (2013.01)

(58) Field of Classification Search
CPC .......................... G07F 19/2055; G06K 19/073
USPC .......................................................... 235/379
See application file for complete search history.

(56) References Cited

U.S. PATENT DOCUMENTS

| | | | | |
|---|---|---|---|---|
| 7,075,455 B2 | 7/2006 | Nishimura | | |
| 8,251,282 B2 | 8/2012 | Clark | | |
| 9,000,892 B2 * | 4/2015 | Hinman | G06K 7/10267 | 340/10.1 |
| 2001/0043159 A1 * | 11/2001 | Masuda | H01Q 1/38 | 343/700 MS |
| 2005/0151645 A1 | 7/2005 | Meskens | | |
| 2007/0055870 A1 | 3/2007 | Bruti | | |
| 2011/0184867 A1 * | 7/2011 | Varadarajan | G06Q 20/04 | 705/44 |
| 2012/0019354 A1 | 1/2012 | Saldin | | |
| 2013/0069737 A1 | 3/2013 | See | | |
| 2015/0213427 A1 * | 7/2015 | Hodges | G07F 19/2055 | 705/18 |
| 2015/0326853 A1 * | 11/2015 | Grzelka | G01R 23/16 | 348/192 |

FOREIGN PATENT DOCUMENTS

WO WO 2010123471 A1 * 10/2010 ......... G07D 11/0042

OTHER PUBLICATIONS

John Herman, "Why Everything Wireless is 2.4GHz", Wired.com (Sep. 7, 2010), retrieved by the Examiner from www.wired.com/2010/09/wireless-explainer/ on Oct. 17, 2017.*

* cited by examiner

*Primary Examiner* — Claude J Brown
(74) *Attorney, Agent, or Firm* — Hunton Andrews Kurth LLP

(57) ABSTRACT

Various embodiments are configured to detect a foreign object that has been implanted into or onto a device, such as a secure POS terminal. The implanted object can be a device that is designed to skim data (such as account information from a transaction card or other transaction device) and transmit the skimmed data to a nearby receiver using an RF transmission, such as Bluetooth or WIFI. The RF transmission can be detected by a RF detector in the POS terminal, the detected signal is converted to a voltage signal, and is input to the ADC port of a microprocessor where it is subsequently analyzed to determine if the RF transmission is from a foreign object. The POS terminal may forward collected data on the RF transmission to a cloud/backend server. Further analysis may occur at the cloud/backend server.

17 Claims, 8 Drawing Sheets

250

DETECTING RF TRANSMISSION FROM AN IMPLANTED DEVICE IN A POS TERMINAL

BACKGROUND OF THE INVENTION

1. Field of the Invention

The present disclosure relates generally to detection of radio frequency (RF) transmissions from a device. Specifically, various embodiments relate to detecting RF transmissions by a foreign device implanted in or on a point of sale (POS) terminal.

2. Description of the Related Art

Typically, a foreign device, such as a skimming device, is implanted within a POS terminal and intercept/read account data from a user's credit or debit card during a transaction. The skimming device then transmits this intercepted information to a nearby receiver using some form of RF transmission protocol. Thus, a user's account information can be stolen and then misused. POS terminals are not configured to detect the RF transmission of the intercepted account information These and other deficiencies exist.

SUMMARY OF THE INVENTION

An exemplary embodiment includes a RF detection system. The system has an integrated antenna tuned to a predetermined frequency. A RF detector communicatively coupled to the antenna and configured to process a signal from the antenna, the RF detector being further communicatively coupled to an analog to digital convertor (ADC) port of a processor, and the antenna signal is converted to a voltage output for input to the ADC port, upon a RF strength detection threshold being met. The processor is configured to process the input from the RF detector and determine if an event count threshold is met indicating that a potential skimming device is present and transmitting on the predetermined frequency.

Another exemplary embodiment is a method for detecting RF transmissions. The method includes: detecting a RF transmission by a RF detector, comprising an antenna; transmitting data, in the form of a voltage output, from the RF transmission detection to a processor upon the RF transmission meeting a RF strength detection threshold; applying an algorithm, by the processor, to determine if the RF transmission is from a foreign device based on a pattern of the RF transmission meeting an event count threshold; and, upon a successful determination of the RF transmission being from the foreign device, transmitting an alert to a remote server.

These and other embodiments and advantages will become apparent from the following detailed description, taken in conjunction with the accompanying drawings, illustrating by way of example the principles of the various exemplary embodiments.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
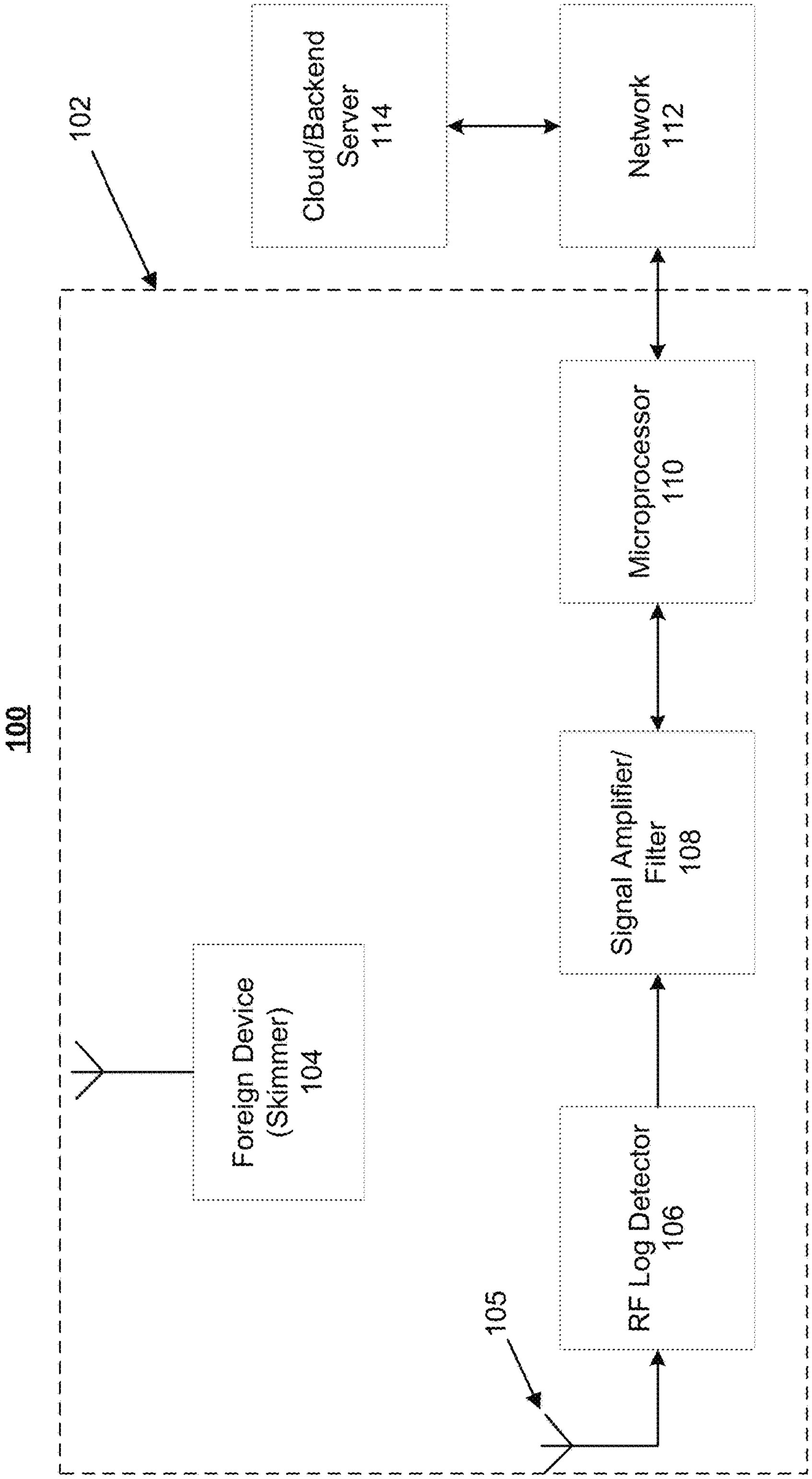
FIG. 1 depicts a system according to exemplary embodiments.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Various embodiments are configured to detect RF transmissions from a foreign object that has been implanted into or onto a secure device. The secure device may be a payment processing device such as a POS terminal. According to exemplary embodiments, the foreign object may be a device designed to skim data (e.g., a "skimmer"). The skimmed data may include account information from a transaction card or other transaction device. The device may be configured transmit the skimmed data to a nearby receiver using an RF transmission. The transmission may occur at set intervals, random intervals, upon skimming the data, upon receipt of a signal from the receiver, and/or combinations of these intervals.

The use of the term "POS terminal" is meant to be exemplary and non-limiting. For example, the POS terminal according to exemplary embodiments may be any type of POS device, including PIN pads, electronic cash registers, Automated Teller Machines (ATMs), card payment terminals, card readers/controllers, and the like, as well as unattended POS devices, such as petrol kiosks. The RF transmission may use any type of wireless data transmission protocol. According to exemplary embodiments, the RF transmission scheme is Bluetooth. In various embodiments, the RF transmission scheme may include other protocols such as WIFI, 3G, 4G, GSM, and CDMA.

Exemplary embodiments are configured to detect and analyze the RF transmission. The RF transmission may be a foreign transmission not associated with the operation of the POS terminal. Once the RF transmission is detected, data associated with the detection may be analyzed at the POS terminal. Additionally or alternatively, the data may be transmitted, from the POS terminal, to a cloud/backend server for analysis. For example, a set of RF transmission data may be analyzed for a pattern (i.e., correspondence of RF transmissions to conduct of transactions at the POS terminal) to decide if the particular POS terminal is compromised and further action is required. In various embodiments, the analysis of the data may be performed remotely at the cloud/backend server.

The antenna may be tuned to the frequency of the RF transmission protocol it is configured to detect. For example, exemplary embodiments may use an antenna tuned to 2.4 GHz for detecting both Bluetooth, and WIFI, transmissions. In various embodiments, the antenna may be tuned to other frequencies such as 800 MHz, 1800 MHz, and/or 1900 MHz, and/or a range of frequencies. The antenna may be communicatively coupled to a RF detector that outputs a voltage output. The voltage output may be linearly related to RF transmission power of the detected RF transmission. Since both Bluetooth and WIFI (as well as other RF transmission protocols) are digitally modulated, there are distinct transmission patterns that may be collected and analyzed. The voltage output may be input into a microprocessor's analog to digital converter port (ADC). Signal amplification/filtering may be performed on the voltage output prior to input to the ADC port.

Various embodiments of the present invention and their advantages may be understood by referring to FIGS. 1-5.

Referring to FIG. 1, a schematic diagram of a system 100 is shown, according to an exemplary embodiment. The system 100 of FIG. 1 may be implemented in a variety of ways. Architecture within system 100 may be implemented as hardware components (e.g., modules) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

The system 100 may have a POS terminal 102. A foreign device, such as a skimmer device 104 (i.e., a foreign skimming device), may be inserted into or onto the POS terminal 102. The skimmer device 104 may be capable of intercepting account information from a transaction device during a transaction conducted at the POS terminal. For example, the skimmer device 104 may read account information from a magnetic stripe of a transaction card, or it may detect the entry of an authorization code at the POS terminal. In various embodiments, the skimmer device 104 may intercept account information during a chip or RF transaction (e.g., NFC or RFID). The skimmer device 104 may transmit this intercepted account information using an RF transmission. The RF transmission may be from the skimmer device 104 to a nearby receiver. The receiver may be located separate and apart from the foreign skimmer device and the POS terminal. According to exemplary embodiments, the RF transmission may be over Bluetooth or WIFI at a frequency of 2.4 GHz.

The system 100 may further have an antenna 105, a RF detector 106, a signal amplifier/filter 108, a microprocessor 110 that includes a microprocessor control unit (MCU), a DAC port, and an ADC port, a network connection 112, and a cloud back end server 114. The antenna 105, the RF detector 106, the signal amplifier/filter 108, and the microprocessor 110 may be a part of the POS terminal 102. The output of the signal amplifier/filter 108 may be input into the ADC port of the microprocessor 110. The microprocessor 110 may be a part of the POS terminal 102. For example, the POS terminal 102 may have a microprocessor that supports its operation and that processor may serve as the microprocessor 110 in the system 100 as well as providing the microprocessor 110 supporting the system and method as described herein; in this embodiment, the antenna 105, the RF detector 106, and the signal amplifier/filter 108 may be installed as part of a module into the POS terminal 102. In various embodiments, the microprocessor 110 may be a separate microprocessor. For example, the antenna 105, the RF detector 106, the signal amplifier/filter 108, and the microprocessor 110 may be implemented on a module or assembly that may be optionally installed into a POS terminal 102. In one embodiment, the POS terminal 102 may have a first microprocessor that supports the point-of-sale operations and a second microprocessor 110 that supports the system and methods as described herein. The second microprocessor maybe integrated into the POS terminal or may be integrated into a module that supports the system and methods for detecting a skimmer device, such as skimmer device 104.

For example, the various components as described herein may be integrated in a POS terminal during its manufacturing process. In various embodiments, the components may be added to the POS terminal after it is manufactured. These components may be in the form of modules or assemblies that can be integrated into the POS terminal and communicatively coupled to the appropriate portions of the POS terminal, such as a printed circuit board assembly and/or the microprocessor 110.

Further, as described below with respect to FIG. 2A, the microprocessor 110 may have a DAC port. A signal may be input from the microprocessor 110 to the RF detector 106 and the signal amplifier/filter 108.

The antenna 105 may be a 50 ohm terminated antenna, and it can be mounted inside the POS terminal on a printed circuit board assembly. The antenna position and size depends on the product form/fit and design. That is, the design of the POS terminal may drive the antenna configuration. The antenna configuration may also depend on whether it is integrated into the POS terminal. In various embodiments, the antenna may be implemented as part of a module or retrofit assembly within the POS terminal. For example, the antenna may be a separate assembly that is plugged into or otherwise communicatively coupled to the RF detector 106.

According to exemplary embodiments, the antenna 105 may be tuned to 2.4 GHz with its highest efficiency in the band of 2.4 Ghz to 2.5 Ghz. For example, the antenna 105 may be a Molex 2.4 GHz antenna or a Johanson Technology 2.45 GHz High Gain SMD Chip Antenna. According to various embodiments, the antenna 105 may be tuned to other frequencies to accommodate detection of various RF transmission protocols.

The network 112 may be the Internet, Local Area Network, Wide Area Network, or another type of network, which could be public or private. The connection to the network 112 may be a wired or wireless connection or a combination thereof.

The cloud/backend server 114 may be located separate and apart from the POS terminal 102. According to exemplary embodiments, the cloud/backend server 114 may be located geographically remote from the POS terminal. The cloud/backend server 114 may be a part of a network associated with the POS terminal, such as a payment processing network.

Figure 2A:
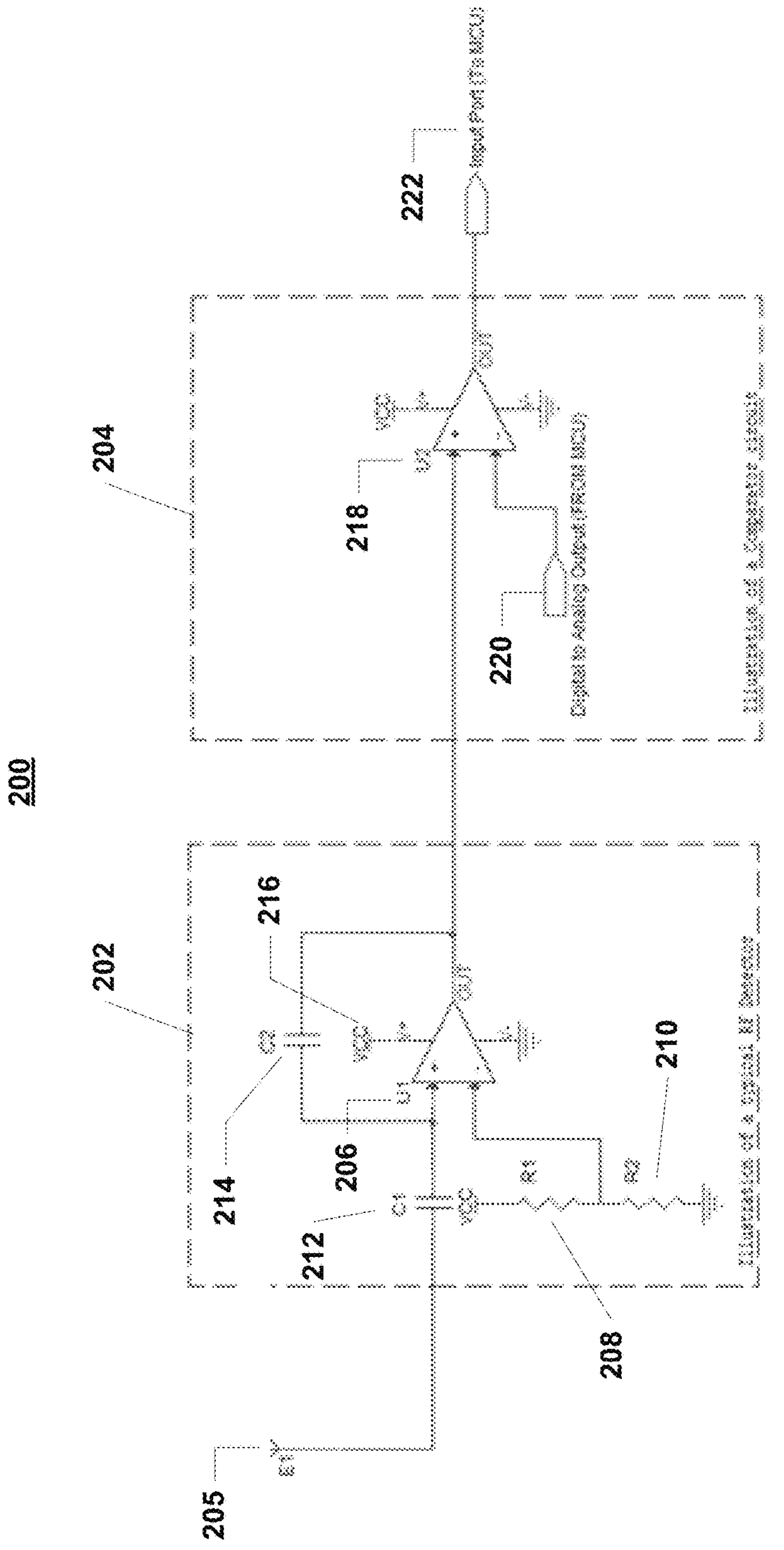
FIG. 2A depicts a schematic illustration of a RF detector and threshold comparator according to exemplary embodiments.
Figure 2B:
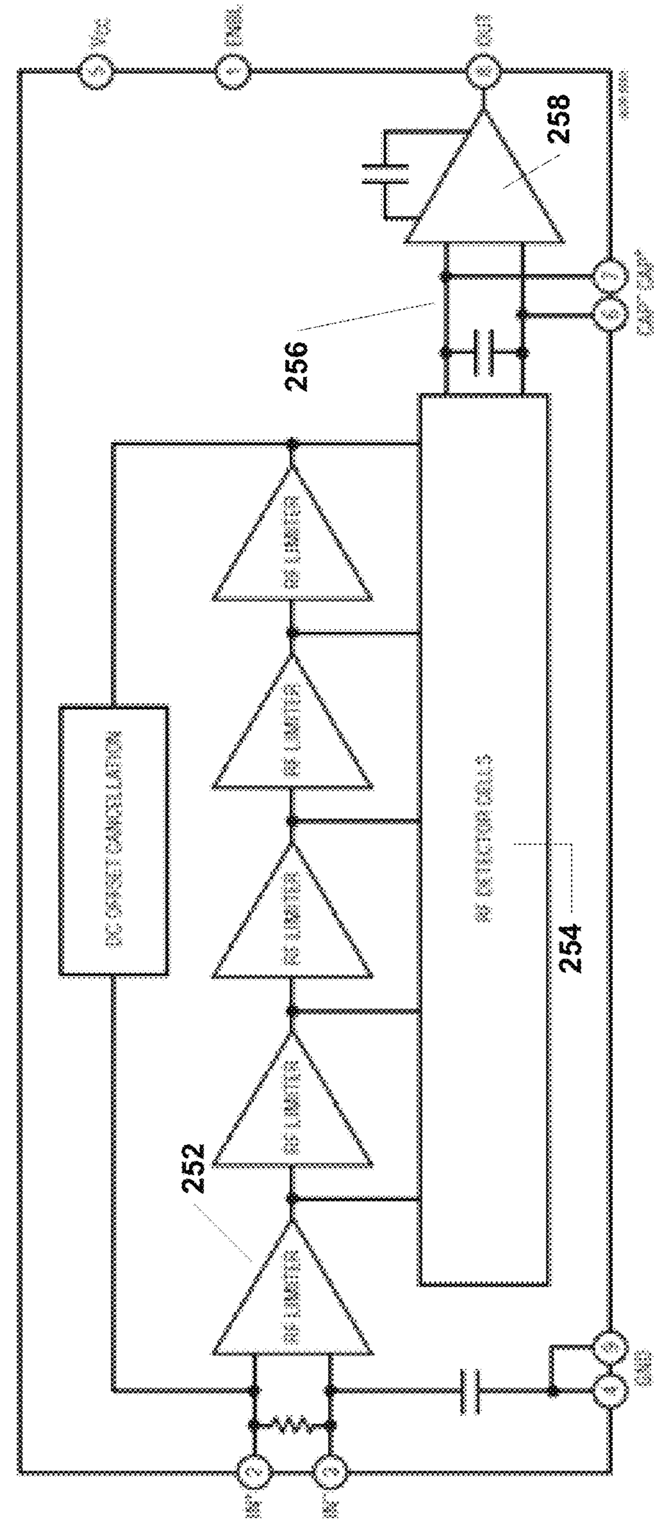
FIG. 2B depicts a schematic illustration of a RF detector integrated circuit according to exemplary embodiments.

FIG. 2A is an exemplary schematic of the RF detector 106 and the amplifier/filter 108 of FIG. 1. FIG. 2B is another exemplary schematic of an implementation of an RF detector.

FIG. 2A depicts a schematic 200 of an example of a RF detector circuit 202 and a comparator circuit 204, comprising an operational amplifier 206 (U1) with resistors 208 (R1) and 210 (R2), capacitors 212 (C1) and 214 (C2), and power supply Vcc 216. Capacitor 212 smooths out fluctuations from the signal received from the antenna 205. The output is connected to the non-inverting terminal (+) of operational amplifier 206 with feedback capacitor 214. The inverting terminal (−) input of operational amplifier 206 draws no current from resistors 208 and 210. The output of the operational amplifier 206 is fed as an input into the comparator circuit 204. In the embodiment illustrated in FIG. 2A, the output of the operational amplifier 206 of the RF detector circuit 202, which is a voltage that represents the signal strength of the RF signal received from the antenna 205, is fed as a first input (+) to a comparator 218 (U2). A microprocessor control unit (MCU) provides a digital-to-analog (DAC) output signal through a DAC port 220 to a second input (−) of the comparator 218. The DAC output signal from the MCU represents a threshold signal strength to which the RF signal strength from the RF detector circuit 202 is to be compared. The comparator 218 compares the RF signal strength from the RF detector circuit 202 to the threshold signal strength from the DAC port 220, to produce an output signal which indicates whether the threshold signal strength is exceeded. The output of the comparator 218 is then fed into the ADC port 222 of the MCU. In some implementations, the MCU may utilize the output of the comparator 218 and dynamically adjust the threshold signal level as necessary.

FIG. 2B depicts a schematic 250 of an example of an integrated circuit (IC) for a RF detector. The RF detector IC measures RF signals by employing cascaded RF limiting amplifiers 252 and RF detector cells 254. The outputs from these amplifiers and detectors are summed and filtered by filtering circuitry 256, which may include one or more capacitors, before they are applied to an output buffer amplifier 258 to produce a DC voltage proportional to the input RF signal. In various embodiments, the DC voltage, which represents the signal strength of an RF signal, may be compared to a threshold voltage by a comparator circuit, such as the comparator 204 as shown in FIG. 2A and described above, to determine whether the signal strength of the detected RF signal exceeds the threshold. The RF detector and threshold comparator may be implemented in various manners within the scope of the disclosed subject matter. For example, in some implementations, the RF signal strength may be detected and compared to a threshold signal strength on a logarithmic scale instead of a linear scale. In such implementations, the RF detector may be a RF log detector.

Figure 3:
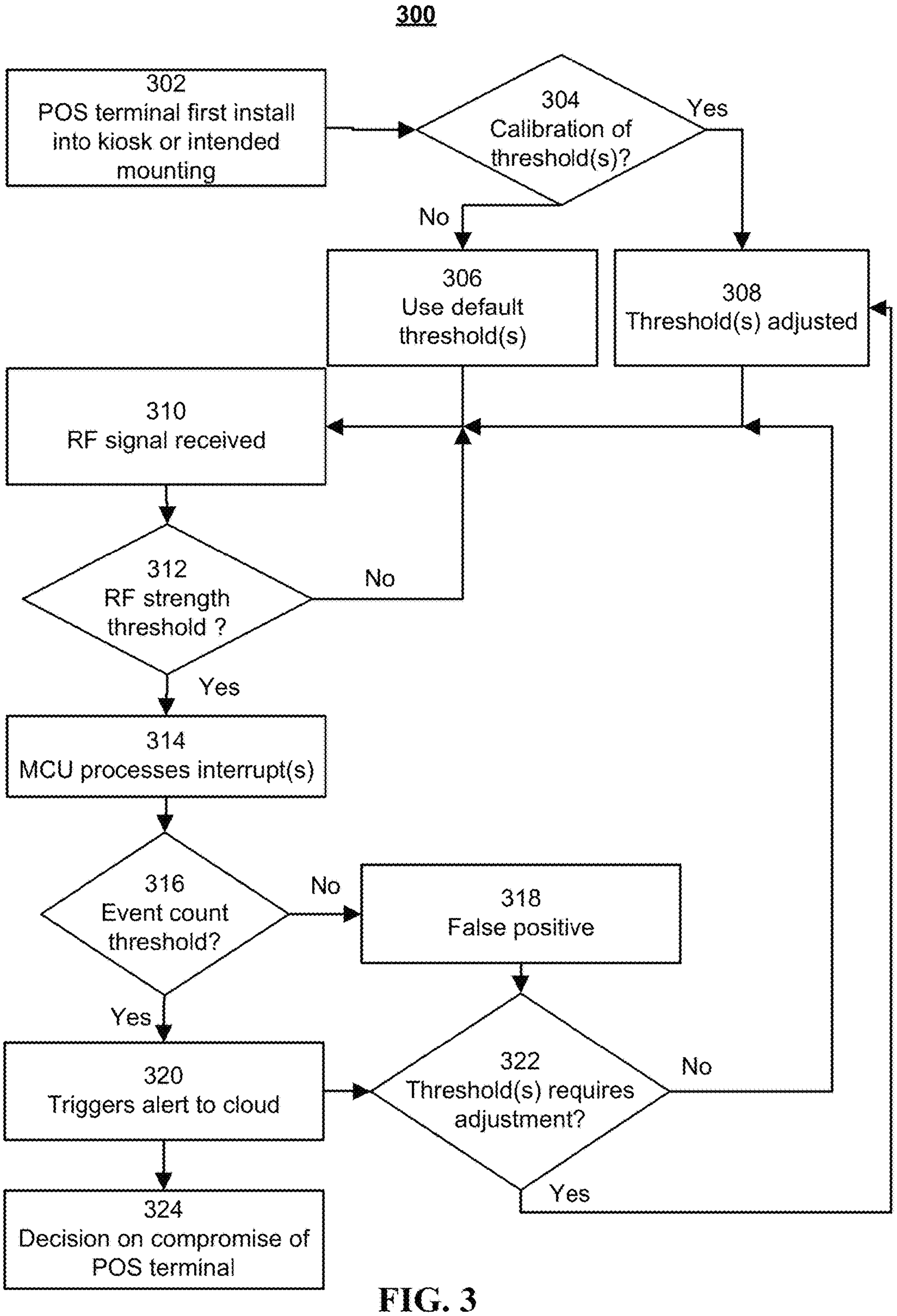
FIG. 3 depicts a flow chart of a method for RF detection according to exemplary embodiments.

FIG. 3 depicts a flow chart of a method for RF detection.

At block 302, a POS terminal may be installed and/or positioned at or into its intended location. The intended location may include mounting of the POS terminal, such as at a kiosk or in a vehicle. For example, the POS terminal may be installed at a petrol pump kiosk, installed at a merchant location, or be installed in a taxi. It should be appreciated that the POS terminal may be installed at other locations and/or positions.

At block 304, a determination is made whether calibration is required. The calibration may include calibration of a RF strength detection threshold and calibration of an event count threshold. This calibration may be performed in the POS terminal mounting environment. The calibration may set an appropriate RF strength detection threshold and event count threshold for the operational environment of the POS terminal.

The RF strength detection threshold establishes the sensitivity of the RF detector for RF detection (i.e., processing a detected RF signal to send to the MCU as described below) based on the RF environment in which the POS terminal is mounted. For example, if a RF transmission is detected, it could be environmental RF noise, rather than a RF signal of interest. The RF strength detection threshold calibration sets a particular noise level (e.g., for signal amplifier/filter 108) so that environmental noise does not get processed (since it is below the set threshold) and only RF signals above the threshold are processed and sent to the MCU as described herein.

The event count threshold may define sensitivity and provide a threshold for determining if a problem is present (e.g., a skimmer device is present) based on an interrupt count of RF signals to the MCU (from the RF detector). An event count can be used to denote a risk level (e.g., low/medium/high) as described below, where low means acceptance of more event counts while high risk denotes an alarm with fewer event counts. For example, if a certain number of events are detected over a certain time period, it may be classified as the presence of a skimmer device.

The event count threshold can be set at differing sensitivity levels. These sensitivity levels may be in the form of low/medium/high levels. For example, if the POS terminal is located in a "noisy" RF environment, the event count threshold may be set higher to eliminate at least some false positives. In a benign or calm RF environment, the event count threshold may be set lower to provide more sensitive detection of possible RF signals from a skimmer device. It should be appreciated that other levels and number of levels may be used.

At block 306, if no calibration is performed, default values for the RF strength detection threshold and event count threshold may be selected.

At block 308, if the default values are not selected, then a calibration is performed to set a RF strength detection threshold and/or an event count threshold.

It should be appreciated the one or both thresholds may be calibrated/adjusted at this step. For example, the RF strength detection threshold may be calibrated and the default event count threshold used.

Once performed (or the default threshold(s) selected), then the terminal is ready for RF detection.

At block 310, a RF signal is detected. If the RF signal is within the range of the particular frequency to which the antenna is tuned, the RF signal will be passed to the RF detector.

At block 312, the RF detector determines if the RF signal meets the RF strength detection threshold. If so, then an interrupt is sent to the MCU. If not, no interrupt is sent. In each case, the RF detector then awaits a new RF signal for processing.

Further, it should be appreciated that while the method 300 indicates a linear flow of the signal detection into processing, etc., RF signals may be received continuously, in certain cases, in which case there is continuous receipt of signals and processing thereof as described herein. Therefore, multiple signals may be in the method 300 at any one time at various stages of processing. Many received RF signals may not make it past step 312 (i.e., not meeting the RF strength threshold). For example, a first signal may be detected and enter the processing sequence past step 312 (i.e., it may meet the RF strength threshold). While the first signal is processing through the method described below, a second signal may be detected and enter the processing loop. The second signal may not meet the RF strength threshold. The first signal could be from a skimmer device and the second signal could be from a nearby cell phone. There are a multiplicity of possible scenarios of this type.

At block 314, the MCU processes the input. Detected RF signals are provided to the MCU as an interrupt. Once an interrupt is received, the MCU begins collecting the interrupts. The MCU splits the incoming interrupts into a detection duration and a detection count. Thus, when a first interrupt is detected by the MCU, the MCU counts every interrupt that is detected over a certain period of time. When the MCU count of interrupts over a certain period of time exceeds the set limit, this is identified as an event. For example, the MCU (using a programmed algorithm and/or logic) records once the interrupt arrives and the MCU starts counting how many interrupts ("x") are within a fixed time period ("y") to determine is an event has occurred ("z"). After the time period lapses, the MCU restarts the process.

Using a hypothetic example, "y" may be 1 second ("1 s") and the set limit is 100 interrupts ("x") in time y. Thus, when a first interrupt is received, the MCU counts the number of interrupts it receives during the time period: a 1 s time period. If the MCU counts 100 interrupts in 1 s, it will identify this as a probable event ("z"). Thus, once the RF signal pulses fall within the x-y configuration, this becomes a detected RF transmission event (z). In certain embodiments, the system may use the number of detected RF transmission events over a second period of time as a further filter for determining whether the presence of a foreign device. For example, if the MCU determines that there have been 10 detected events in a 20 second period, this may be used as a further factor in deciding whether a foreign device is present.

An event may constitute a possible foreign RF transmission detection (e.g., from a skimmer device). The comparison of the signal over time is intended to quantify the amount of RF transmission that is detected over a certain period of time. Since it is not known, for example, how long or short the skimmer device transmits, it must be decided if the detected RF signal is long enough to constitute a problem.

Certain event count scenarios may be used to determine if a foreign skimmer device is present and transmitting. That is, if "z" is detected multiple times and falls within a particular event count scenario, then it may indicate the presence of a foreign skimmer device that is transmitting.

Exemplary events include:

Time stamp event. This type of event may attempt to correlate the RF signal with what the POS terminal is doing when the signal is detected. For example, suppose a RF signal is detected each time a user inserts a card or keys in pin entry, this could indicate a skimmer device is transmitting at these events.

Fixed interval event. The RF signal may be detected at a particular interval. For example, suppose a RF signal is detected at a regular interval (e.g., every 5 minutes). This may indicate a skimmer device is present.

Irregular interval event. The RF signal may not have a regular interval, however, a repetition of RF signals may be used to determine if a skimmer device is present. For example, seemingly randomly RF signals may be detected, but these signals may occur multiple times a day. Therefore, it could be determined that a skimmer device is present and transmitted only when it has a full input and needs to send its data. This may be flagged as a potential skimmer device and further investigation is required.

It should be appreciated that the above event count scenarios are meant to be exemplary and non-limiting and the scenario parameters can be adjusted as necessary and/or required.

At block 316, the event count threshold is evaluated by the MCU. As noted above, the event threshold is set to define sensitivity and determination if a problem is present (e.g., a skimmer device is present).

At block 318, if the event count threshold is not met, then it may be determined to be a false positive and the event is not further processed.

At block 320, if event count threshold is met (i.e, the detection is positive based on the analysis of the detected signal and the event count), then an alert may be triggered to the cloud or backend server. This alert may be transmitted over a network as described above. The cloud/backend server may be responsible for determination if a foreign skimming device is present based on an analysis of the received data. According to various embodiments, as part of the alert, data regarding the RF detection may be transmitted.

At block 322, a determination may be made if either or both of the thresholds (RF strength detection and event count) require adjustment. The determination may be made by the MCU. In an embodiment, the thresholds may each be adjusted by a user of the POS terminal. In various embodiments, the thresholds may be automatically adjusted by the MCU based on, for example, the RF detections and the algorithm described above, as well as programmed rules.

In various embodiments, the determination may be a closed loop that allows the user to adjust the RF strength detection threshold or event count before generating an alert to the cloud. For example, in a scenario where the system is mounted near a crowded area where mobile phones are present, there may be multiple RF transmission detections that are seemingly random so the event count threshold can be adjusted higher to account for this scenario.

The thresholds may be adjusted based on (1) risk alert level (e.g., low, medium, high); (2) detection frequency alert (e.g., how many detections per a particular time period); (3) how closely the detection coincides with a transaction (e.g., within 1 min, 5 min, 10 min, etc.).

For example, instead of trying to quantify how long or short a detected RF signal is, correlation of the transmission to a transaction may be performed. Suppose a credit card transaction is conducted and within minutes, for example, a string of RF transmissions is detected by the system. Accordingly, there is a possibility that a skimmer device has been successfully implanted in the POS terminal and is attempting to transmit skimmed data. A skimmer device that uses a mobile phone frequency for transmission will look similar to other mobile phones, except for the transmission pattern (e.g., timing and intervals of transmission). Therefore, if a pattern of transmissions following a completed transaction is detected (e.g., a detected transmission repeatedly occurs within minutes of a transaction), this may indicate that a skimmer device is present and an alert should be sent to the cloud/backend server. The time period between the transaction and the transmissions may be determined or adjusted as necessary and/or desired.

As a further example, detected RF incidents may be false positives because the RF strength detection threshold is set too low. Once an event fits a setting, then the POS terminal may send an alert to the cloud or remote server for evaluation. The RF strength threshold, however, may have been set too low, and RF detections are made randomly, for example, as people walk passed the terminal using RF devices (e.g., mobile phones). The device location may cause a further investigation to determine if these are valid events or to re-adjust the thresholds. For example, a petrol station in a rural area may receive very little RF interference (that is, there may be few external RF signals from nearby devices), so a low threshold may be used. In contrast, an ATM machine mounted in a busy mall may receive more false positives from a variety of nearby RF devices (e.g., cell phones from mall patrons), so a higher threshold may be required.

At block 324, a decision on the compromise of the POS terminal may be made. For example, upon a confirmed, positive detection of a RF incident during a transaction, the POS terminal may be declared comprised and a further investigation conducted. A positive detection may occur based on the event count, patterns in the RF incident data such as the duration or sequences of transmissions, and/or a combination of factors.

In various embodiments, the MCU may determine if a skimming device is present and if the POS terminal has been compromised. This determination may be made at block 316 after the processing of the interrupt(s) and determining the event count threshold being met. An alert may be sent to the cloud at block 320 to provide data to the remote servers.

The POS terminal may be shut down or disabled, either locally or remotely. In various embodiments, additional data may be collected before a decision is made.

For example, the MCU may collect data on RF detections over a period of time before sending the alert and the data regarding the RF detections. The MCU may be capable of initiating certain functions to protect the POS terminal, including initiating a shutdown of the POS terminal based on the collected data regarding the RF detections. In various embodiments, the cloud/backend server may be capable of performing remote functions on the POS terminal, including initiating a shut down or disablement of the POS terminal. The cloud/backend server may be able to override the shutdown of the POS terminal if initiated by the MCU.

In other embodiments, the MCU may classify the RF detection as a possible foreign skimming device based on the results of the processing of the RF detection (e.g., the RF signal). The MCU may rely upon RF detection data collected over a certain period of time in performing this determination. The MCU may be programmed to initiate particular actions at the POS terminal in the event of detection of a foreign skimming device. For example, the MCU may shutdown or otherwise disable the operation of the POS terminal to allow for further evaluation of the POS terminal and investigation on the potential foreign skimming device. In this case, the MCU may trigger an alert to the cloud/backend server that it has initiated particular actions based on one or more RF detections.

The description of the method 300 above includes the MCU performing analysis of the detected RF transmissions and providing information to the cloud/backend server. This is exemplary and meant to be non-limiting. For example, in various embodiments, the data of the detected RF transmissions may be sent to and processed in the cloud/backend server, where determinations about the compromise of the POS terminal may be made. The MCU in this case may still receive the interrupt signal from the RF detector, but instead of further processing the information, the MCU may store the received signal data and then transmit to the cloud/backend server for further processing. The MCU may store signal data for a certain period of time before processing. Alternatively, the MCU may store a certain amount of signal data prior to transmission. In other embodiments, the MCU may transmit the data to the cloud/backend server without interim storage. The cloud or backend server may process the signal information as described above and may further make a determination on adjustment of the thresholds. Additionally, the cloud/backend server may made a determination on the compromise of the POS terminal and take appropriate action.

In other embodiments, a combination of processing between the POS terminal and the cloud/backend server may be used. For example, the POS terminal may analyze the signal as described above and the cloud/backend server may analyze the signal also (the POS terminal may transmit the signal information along with its analysis).

Figure 4:
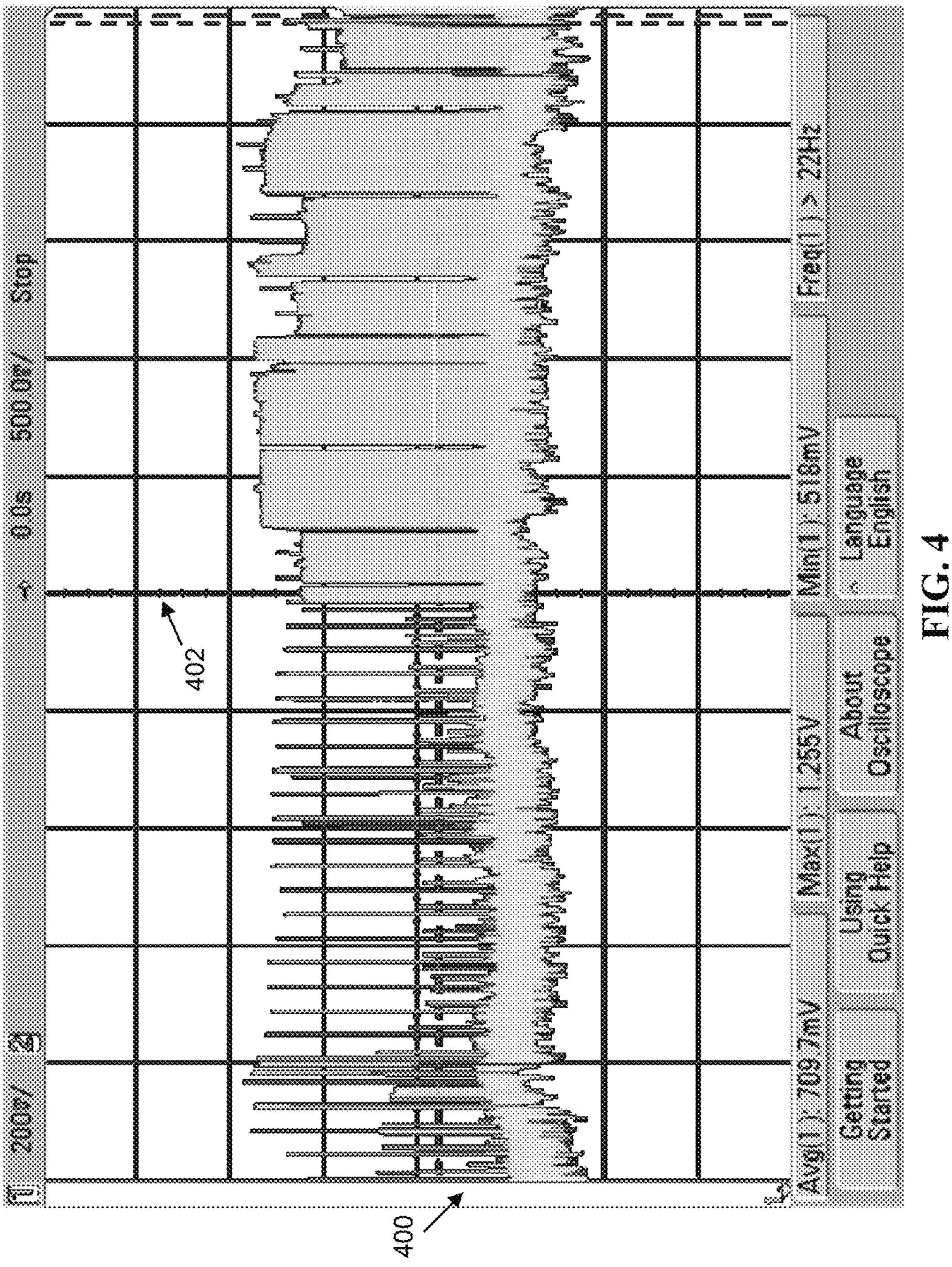
FIG. 4 is a graphical depiction of a Bluetooth transmission signal according to exemplary embodiments.

FIG. 4 is a graphical depiction of a Bluetooth transmission signal according to exemplary embodiments. Specifically, FIG. 4 depicts voltage output 400 from a RF detector. The first half of the graph (to the left of center axis 402) depicts the output with a Bluetooth transmitter off and the second half of the graph (to the right of center axis 402) depicts the output with the Bluetooth transmitter on. This transmission may represent the RF detector output when a foreign skimmer device is in transmission mode using Bluetooth. The nearer the foreign device is to the antenna, the higher will be the voltage output into the ADC.

Figure 5A:
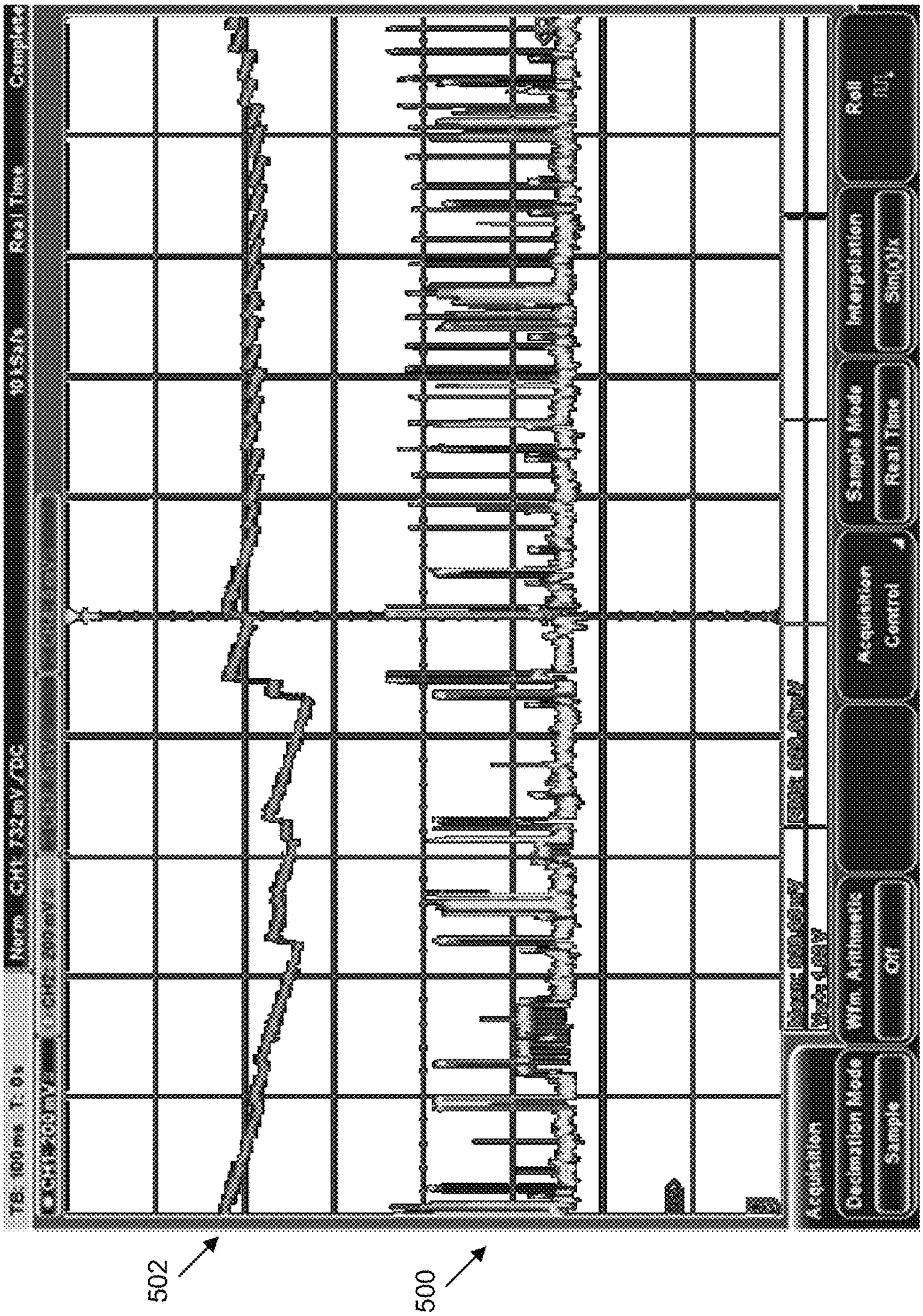
FIG. 5A is a graphical depiction of a WIFI transmission signal according to exemplary embodiments.
Figure 5B:
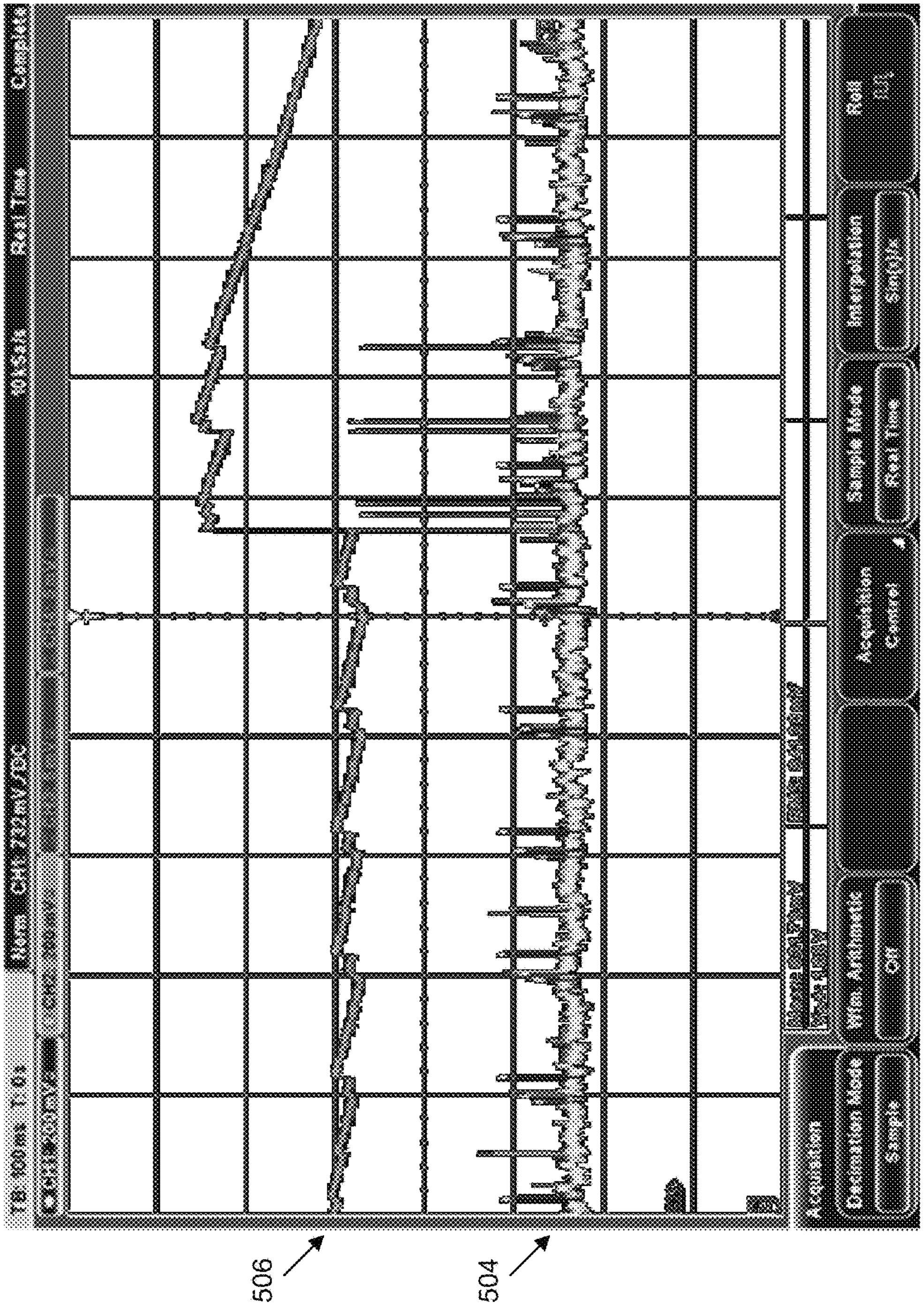
FIG. 5B is a graphical depiction of a GSM voice transmission signal according to exemplary embodiments.
Figure 5C:
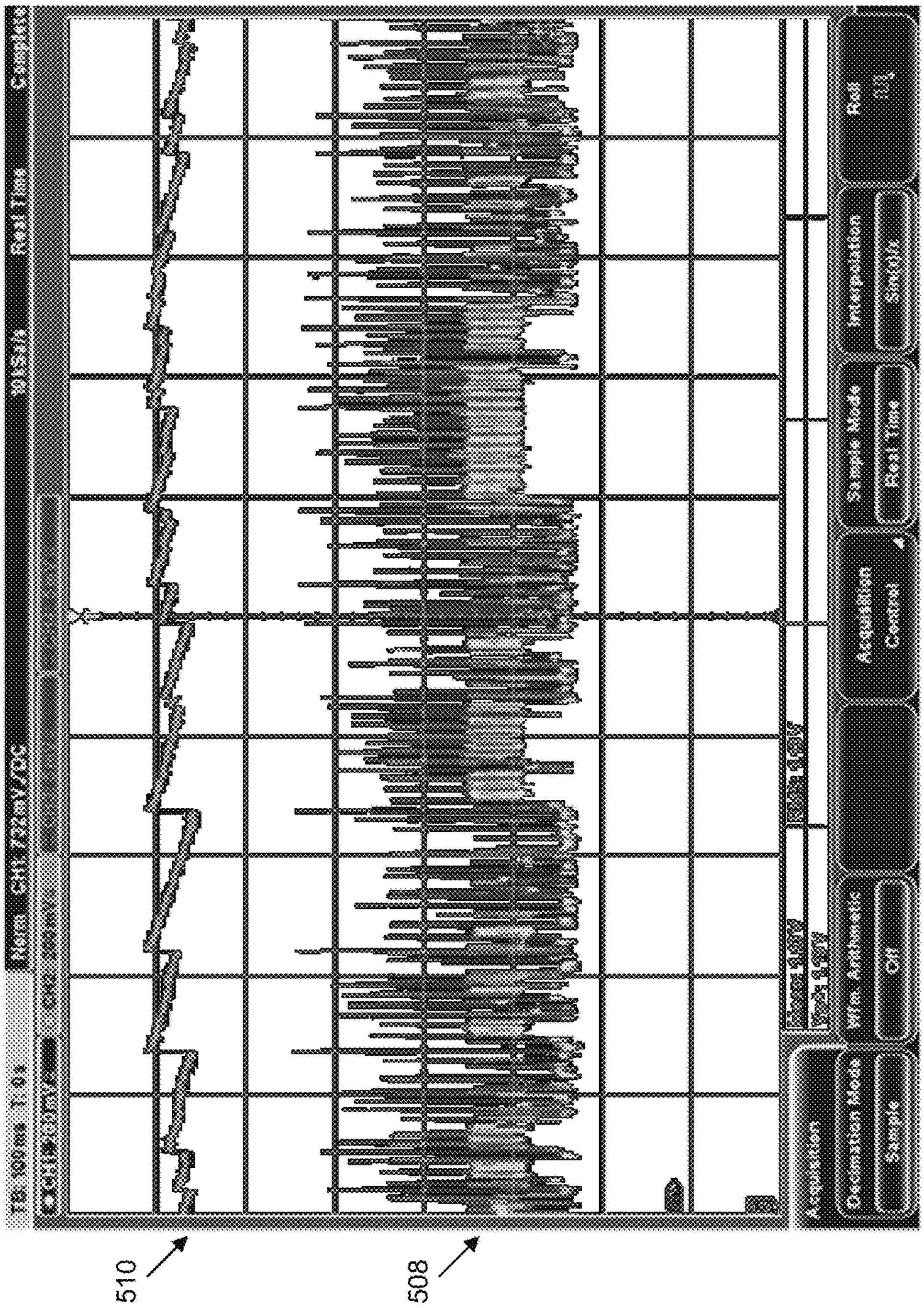
FIG. 5C is a graphical depiction of a 4G/LTE data transmission signal according to exemplary embodiments.

FIGS. 5A-5C provide graphical depictions of other types of RF transmission signals. As described above, exemplary embodiments may be configured to detect these RF transmissions and analyze them accordingly to determine if the signal is from a skimmer device.

FIG. 5A is a graphical depiction of a WIFI transmission signal from a typical phone according to exemplary embodiments. FIG. 5B is a graphical depiction of a GSM voice transmission signal from a typical phone according to exemplary embodiments. FIG. 5C is a graphical depiction of a 4G/LTE data transmission signal from a typical phone according to exemplary embodiments. Specifically, FIGS. 5A, 5B, and 5C depict voltage outputs 500, 504, and 508, respectively, from a RF detector. The upper graph lines (labeled as 502, 506, and 510) represent the input RF signal at the antenna. Thus, the detection system, according to exemplary embodiments, can be calibrated to detect the desired Bluetooth signal (from a skimmer device) (or another type of RF transmission such as WIFI, GSM/CDMA, or 4G) and discard other types of RF transmissions in the same frequency range.

It will be appreciated by those skilled in the art that the various embodiments are not limited by what has been particularly shown and described hereinabove. Rather the scope of the various embodiments includes both combinations and sub-combinations of features described hereinabove and variations and modifications thereof which are not in the prior art. It should further be recognized that these various embodiments are not exclusive to each other.

It will be readily understood by those persons skilled in the art that the embodiments disclosed here are susceptible to broad utility and application. Many embodiments and adaptations other than those herein described, as well as many variations, modifications and equivalent arrangements, will be apparent from or reasonably suggested by the various embodiments and foregoing description thereof, without departing from the substance or scope of the above description.

Accordingly, while the various embodiments have been described here in detail in relation to exemplary embodiments, it is to be understood that this disclosure is only illustrative and exemplary and is made to provide an enabling disclosure. Accordingly, the foregoing disclosure is not intended to be construed or to limit the various embodiments or otherwise to exclude any other such embodiments, adaptations, variations, modifications or equivalent arrangements.

What is claimed is:

1. A radio frequency (RF) detection system, comprising:

an integrated antenna tuned to a predetermined frequency;

a RF detector communicatively coupled to the antenna and configured to process a signal from the antenna, the RF detector being further communicatively coupled to an analog to digital convertor (ADC) port of a processor, wherein the antenna signal is converted to a voltage output for input to the ADC port upon a RF strength detection threshold being met wherein the voltage output is linearly related to a signal strength of the signal; and the processor being configured to process the input from the RF detector and determine if the input exceeds a predetermined voltage limit;

wherein upon the input exceeding the predetermined voltage limit, the processor records an event count; and when a number of event counts within a predetermined time meets or surpasses an event count threshold, the RF detection system is configured to indicate that a potential skimming device is present and is transmitting on the predetermined frequency.

2. The RF detection system of claim 1, wherein the antenna is tuned in the range of 2.4 GHz to 2.5 GHz.

3. The RF detection system of claim 1, wherein the RF detection system is integrated into a POS terminal.

4. The RF detection system of claim 3, further comprising:

the processor being further configured to analyze the input and correlate the increase in voltage with one or more of transaction events conducted by the POS terminal, a fixed interval, and an irregular interval.

5. The RF detection system of claim 1, wherein the antenna is mounted on a printed circuit board assembly.

6. The RF detection system of claim 1, further comprising:

a connection to a remote server, the connection being configured to transmit data from the RF detector to the remote server.

7. The RF detection system of claim 6, wherein the remote server determines if the potential skimming device is a skimming device.

8. The RF detection system of claim 1, further comprising:

an amplifier and filter circuit for processing the signal from the antenna.

9. The RF detection system of claim 1, wherein the RF strength detection threshold and event count threshold are configurable.

10. The RF detection system of claim 1, further comprising:

following processing of the input by the processor, determining, by the processor, that at least one of the RF strength detection threshold and the event count threshold require adjustment.

11. A method for detecting radio frequency (RF) transmissions, comprising:

detecting a RF transmission by a RF detector, comprising an antenna;

transmitting data, in the form of a voltage output, from the RF transmission detection to a processor upon the RF transmission meeting a RF strength detection threshold, wherein the voltage output is linearly related to a signal strength of the RF transmission and the voltage output becomes voltage input to the processor;

applying an algorithm, by the processor, to determine if the RF transmission is from a foreign device based on a pattern of the RF transmission meeting an event count threshold wherein an event occurs when a number of the voltage input within a predetermined time period exceeds a predetermined limit;

recording, by the processor, an event count upon the voltage input exceeding the predetermined voltage limit; and upon a successful determination of the RF transmission being from the foreign device based on a number of event counts within the predetermined time period meeting or surpassing the event count threshold, indicating that a potential skimming device is present and transmitting on the predetermined frequency, transmitting an alert to a remote server.

12. The method for detecting RF transmissions of claim 11, wherein the antenna is tuned in the range of 2.4 GHz to 2.5 GHz.

13. The method for detecting RF transmissions of claim 11, wherein the processor is part of a POS terminal.

14. The method for detecting RF transmissions of claim 13, further comprising:

correlating, by the processor, the increase in voltage with one or more of transaction events conducted by the POS terminal, a fixed interval, and an irregular interval.

15. The method for detecting RF transmissions of claim 11, further comprising:

configuring at least one of the RF strength detection threshold of the RF detector and the event count threshold of the processor.

16. The method for detecting RF transmissions of claim 15, further comprising:

configuring at least one of the RF strength detection threshold and the event count threshold following the processing of the voltage input.

17. The method for detecting RF transmissions of claim 11, wherein the remote server determines whether the foreign device is a skimming device.

* * * * *